(12) United States Patent
Avenwedde et al.

(10) Patent No.: US 7,107,779 B2
(45) Date of Patent: Sep. 19, 2006

(54) REFRIGERATING APPLIANCE, ESPECIALLY A REFRIGERATOR

(75) Inventors: Josef Avenwedde, Verl (DE); Werner Klausfering, Verl (DE); Burkhard Pollmueller, Guetersloh (DE); Daniel Schneider, Verl (DE); Rainard Wienstroeer, Steinhagen (DE)

(73) Assignee: Miele & Cie. KG., Guetersloh (DE)

( * ) Notice: Subject to any disclaimer, the term of this patent is extended or adjusted under 35 U.S.C. 154(b) by 207 days.

(21) Appl. No.: 10/502,114

(22) PCT Filed: Jan. 21, 2003

(86) PCT No.: PCT/EP03/00550

§ 371 (c)(1),
(2), (4) Date: Jul. 21, 2004

(87) PCT Pub. No.: WO03/062722

PCT Pub. Date: Jul. 31, 2003

(65) Prior Publication Data
US 2005/0081547 A1    Apr. 21, 2005

(30) Foreign Application Priority Data
Jan. 22, 2002    (DE)    ................ 102 02 444

(51) Int. Cl.
F25D 23/00    (2006.01)
(52) U.S. Cl. .......................................... 62/264; 362/92
(58) Field of Classification Search ................ 62/264, 62/267, 298, 126, 132; 362/92, 125, 133
See application file for complete search history.

(56) References Cited

U.S. PATENT DOCUMENTS

| | | | | |
|---|---|---|---|---|
| 3,506,325 A | | 4/1970 | Horvay | 312/223 |
| 3,572,049 A | * | 3/1971 | Moorman | 62/132 |
| 3,612,848 A | * | 10/1971 | Koch et al. | 362/92 |
| 4,489,995 A | | 12/1984 | Barr | 312/236 |
| 4,706,169 A | | 11/1987 | Bussan et al. | 362/26 |
| 5,287,252 A | | 2/1994 | Caruso | 362/396 |
| 5,450,297 A | * | 9/1995 | Akashi et al. | 362/92 |
| 5,580,155 A | * | 12/1996 | Hildebrand et al. | 362/133 |
| 5,836,669 A | * | 11/1998 | Hed | 362/92 |
| 5,902,034 A | * | 5/1999 | Santosuosso et al. | 362/125 |
| 5,937,666 A | | 8/1999 | Trulaske | 62/264 |
| 5,980,058 A | | 11/1999 | Guess et al. | 362/94 |
| 6,210,013 B1 | | 4/2001 | Bousfield | 362/92 |
| 6,231,205 B1 | * | 5/2001 | Slesinger et al. | 362/133 |

(Continued)

FOREIGN PATENT DOCUMENTS

| | | |
|---|---|---|
| DE | 36 04 759 | 8/1987 |
| DE | 198 30 845 | 1/2000 |

(Continued)

*Primary Examiner*—Mohammad M. Ali
(74) *Attorney, Agent, or Firm*—Karl Hormann

(57) ABSTRACT

The invention relates to a refrigerating appliance, especially a refrigerator, comprising a plate which consists of photoconductive material which can be removed from the refrigerating appliance with an electric light source which comprises a first electrical or electromagnetic transmission element which interacts—in the inserted or mounted state of the plate—with a second electrical or electromagnetic transmission element applied to the refrigerating appliance, in such a way that electrical current can be transmitted from the second electrical or electromagnetic transmission element.

10 Claims, 4 Drawing Sheets

U.S. PATENT DOCUMENTS

| | | | |
|---|---|---|---|
| 6,275,339 B1 | 8/2001 | Chazallet et al. | 359/599 |
| 6,406,108 B1 * | 6/2002 | Upton et al. | 312/116 |
| 6,478,445 B1 * | 11/2002 | Lange et al. | 362/223 |
| 6,558,017 B1 * | 5/2003 | Saraiji et al. | 362/125 |

FOREIGN PATENT DOCUMENTS

| | | |
|---|---|---|
| EP | 0971186 | 1/2000 |
| FR | 2552533 | 3/1985 |
| JP | 9-42820 A * | 2/1997 |
| WO | WO 98/14740 | 4/1998 |
| WO | WO 00/14448 | 3/2000 |

* cited by examiner

REFRIGERATING APPLIANCE, ESPECIALLY A REFRIGERATOR

BACKGROUND OF THE INVENTION

1. Field of the Invention

The invention relates to a refrigerating appliance, especially a refrigerator.

2. The Prior Art

Such a refrigerating appliance is known from German patent specification DE 697 020 771 T2. The subject of this publication is a refrigerator illuminated in its interior, the illumination being provided as a support illuminated at its margin and formed as a plate of substantially transparent material. On the support, there is applied, for instance by printing, a matrix of dots. The dots printed on the surface of the support serve as light emission surfaces. The lights source disposed in a housing arranged along a margin of the support is connected to a current source by a cable and a control mechanism. The known refrigerating appliance suffers from the disadvantage that the spatial arrangement of its marginally illuminated support cannot be adjusted by a user in accordance with his individual and temporally changing desires and requirements.

OBJECT OF THE INVENTION

It is, therefore, an object of the invention to provide a refrigerating appliance in which the spatial arrangement of the marginally illuminated plate may be changed.

SUMMARY OF THE INVENTION

In accordance with the invention the object is accomplished by a refrigerating appliance, in particular a refrigerator, provided with a removable plate and an electrical light source provided with first electrical or electromagnetic transmission means with in the inserted state of the plate cooperates with second electrical or electromagnetic transmission means such that an electric current can be transmitted from the second electrical or electromagnetic transmission means to the first electrical or electromagnetic transmission means.

Advantageous embodiments and improvements of the invention are set forth in the ensuing subclaims.

Aside from the possibility to change the spatial arrangement of the plate utilized as a light conductor, the advantages particularly derived from the invention, is that the plate may be removed completely from the refrigerating appliance. It is possible, for instance, in the interior of the refrigerator to structure the body on several vertically separated planes with second electrical or electromagnetic transmission means so that one or more plates utilized as light conductors may be arranged in different planes in the interior of the refrigerating appliance. It is also possible, simultaneously with the plates used as light conductors and structured as supports to use supports without photoconductive function. Supports with and without photoconductive function may be used equally, by themselves or in combination, in all planes. Retrofitting, for instance, of supports with a different light source or with differently structured light emission surfaces can also simply be done in situ, so that users who lack the technical expertise may carry out the retrofitting. The same is true of defective supports which require replacement. In the case of a plate structured as an intermediate wall disposed at the inner surface of a door, the possibility of removing the plate is of advantage as well. For instance, a damaged or defective plate may be simply replaced by a new plate. Furthermore, cleaning of the plate is facilitated and its cleaning at all surface is made possible.

The first and second electrical or electromagnetic transmission means may basically be selected from a broad suitable range. Advantageously, the first electrical r electromagnetic transmission means is structured as an electrical secondary coil, and the second electrical or electromagnetic transmission means is structured as an electrical primary coil. This allows for an inductive power transmission, i.e. the electromagnetic transmission of electrical current, from the second electromagnetic transmission means to the first electromagnetic transmission means, so that any possible formation of sparks between the first and second electrical contacts in the interior of the refrigerating appliance closed by the door is effectively avoided.

In another advantageous improvement of the invention the first electrical or electromagnetic transmission means is structured as first electrical contacts and the second electrical or electromagnetic transmission means is structured as second electrical contacts which in their inserted or mounted state are electrically conductively connected. This results in a particularly simple realization of the first and second electrical or electromagnetic transmission means.

Kind and material of the plate may basically be selected from a broad range. Advantageously, the plate is structured as a support which is removable from the interior of the refrigerating appliance. In addition, another advantageous improvement provides for the plate being structured as an intermediate wall which may be removed from the inner surface of a door.

An advantageous improvement of the invention provides for the electrical light source being arranged in a housing fixedly or removably connected to the margin of the plate. In this manner, the electrical light source is protected from damage, for instance during insertion into, or removal from, the interior of the refrigerating appliance. Moreover, any undesirable emission of scattered light is prevented.

A useful improvement of the invention resides in the light emission surface being formed by at least one recess in the surface of the support. This ensures a particularly long life of the light emission surface.

In a particular advantageous improvement, the second electrical contacts are structured as receptacles and the first electrical contacts are structured as pins receivable in the receptacles. This results in a structurally simple and functionally safe electrical engagement between the first electrical contact and the second electrical contact.

A further improvement of the invention provides for the second electrical contacts being structured as a planar second contact position substantially flush in a plane of the surface of the refrigerating appliance and the first electrical contacts being structured as planar first contact positions in a plane of a surface of the marginal portion of the plate for electrically conductive engagement with the corresponding second contact positions. This makes possible to structure the first and second electrical contacts in a manner which is optically inconspicuous and to facilitate the cleaning of the interior of the refrigerating appliance.

In an alternative improvement of the previous embodiment the second electrical contacts are structured as a planar second contact position substantially flush in a plane of the surface of the refrigerating appliance and the first electrical contacts being structured as planar first contact positions arranged substantially flush in a plane with a surface of bolts arranged in the marginal portion of the plate for electrical connection with the corresponding second contact positions.

A further advantageous improvement of the invention provides for the refrigerating appliance being provided with a manipulating element and a control unit, whereby names of groceries may be fed into or selected by the manipulating element for comparison in an evaluation circuit of the control unit with names of groceries stored in a memory of the control unit for energizing the light source of the electrical plate by the control unit as a function of the comparison. In this manner it is possible to recommend to the user a placement position depending upon kind and/or weight of the grocery to be stored.

Furthermore, an advantageous improvement provides for the refrigerating appliance being equipped with a safety means for preventing the formation of sparks between the first and the second electrical contact in the interior of the refrigerating appliance closed by the door. In this manner, the formation of sparks is effectively prevented even in the case of electrical contacts arranged in the interior of the refrigerating appliance.

DESCRIPTION OF THE SEVERAL DRAWINGS

The novel features which are considered to be characteristic of the invention are set forth with particularity in the appended claims. The invention itself, however, in respect of its structure, construction and lay-out as well as manufacturing techniques, together with other objects and advantages thereof, will be best understood from the following description of preferred embodiments when read in connection with the appended drawings, in which:

DETAILED DESCRIPTION OF THE PREFERRED EMBODIMENTS

Figure 1:
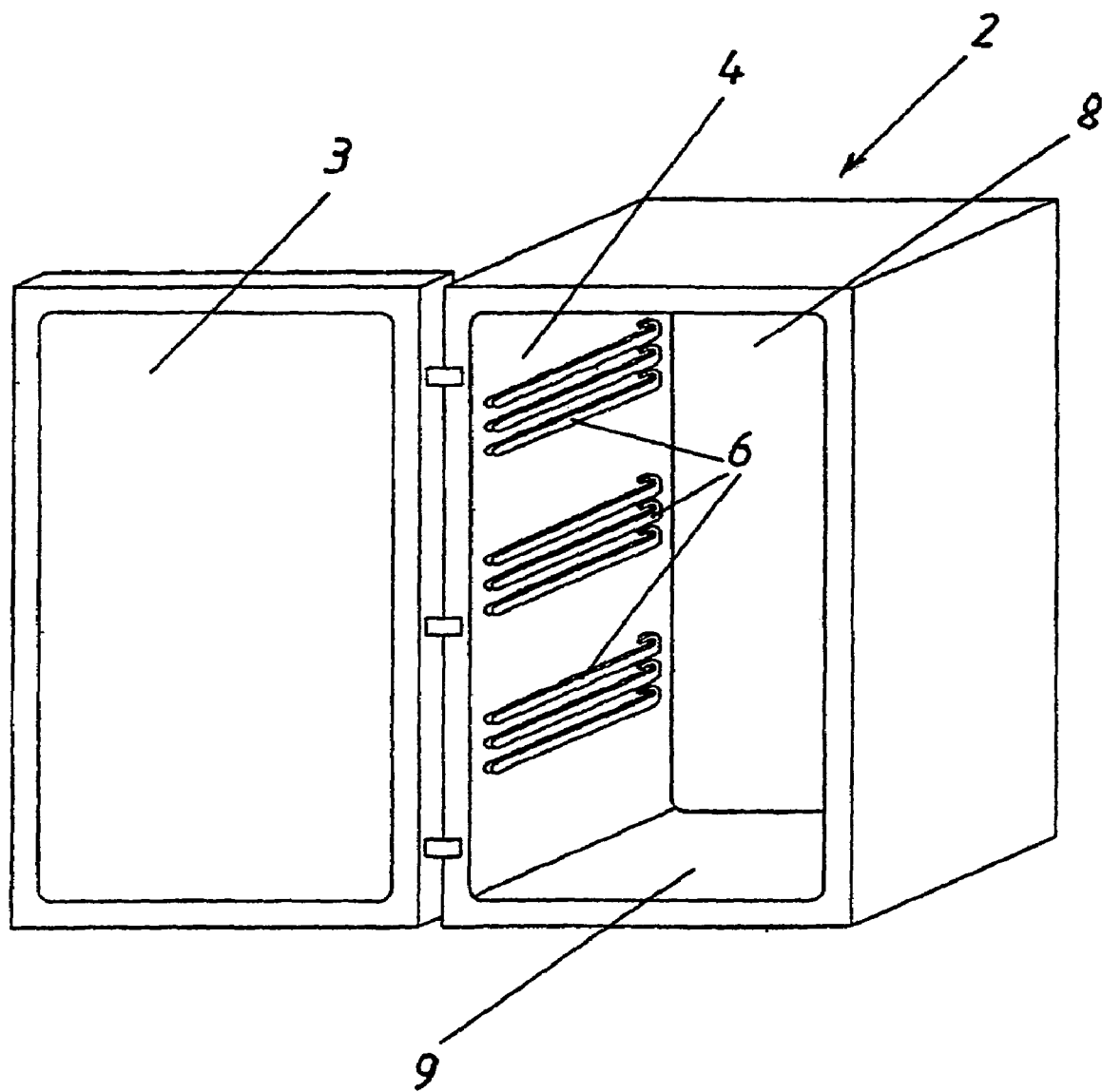
FIG. 1 is a perspective view of a first embodiment of a refrigerating appliance in accordance with the invention, without supports.

A refrigerating appliance 2 is shown in FIG. 1. In this first embodiment, the refrigerating appliance 2 is a refrigerator the interior of which forms a refrigeration chamber 4 closed by a door 3. In the lateral walls of the body defining the refrigeration chamber 4, of which FIG. 1 depicts the left lateral wall only, there are formed protrusions 6 which are vertically spaced and disposed parallel to each other, and which extend vertically with respect to the rear wall 8 of the body defining the refrigeration chamber 4. The protrusions 6 of the two lateral walls are disposed opposite each other in a plane parallel to the bottom 9 of the corpus defining the refrigeration chamber 4.

Figure 2:
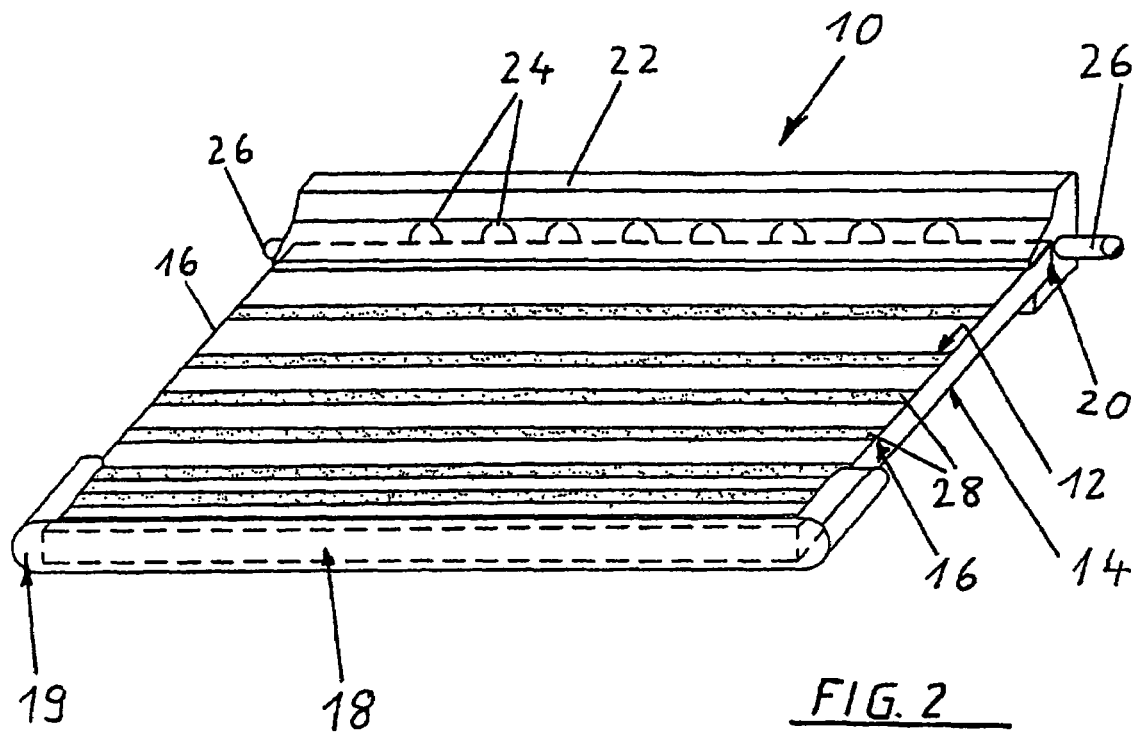
FIG. 2 is a perspective view of a support of the first embodiment of FIG. 1.

FIG. 2 depicts a plate 10 structured as a support which may be inserted into the refrigerator 2 depicted in FIG. 1. The plate 10 consists of glass, i.e. a transparent material, and is provided with an upper surface 12, a lower surface 14, lateral margins 16 as well as a forward hidden margin 18 (shown in broken line) and a rear margin 20. In the area of the forward margin 18, a support element 19 made of polymeric material is rigidly connected to the plate 10 by adhesion. The support element 19 is structured for mounting the plate 10 on the body of the refrigerator 2, i.e. for placement on the protrusions 6. Furthermore, the support element 19 prevents undesired light emission by way of the forward margin 18 and damage to the forward margin 18 as, for instance, by placing containers into, or by removing them from, the refrigeration chamber 4. In an inserted state in which the plate 10 is completely pushed into the refrigeration chamber 4 and is positioned in one plane on two opposite protrusions 6 in the two lateral wall, the lateral margins 16 are located opposite the lateral walls, the rear margin 20 is positioned opposite the rear wall 8, and the lower surface 14 is positioned opposite the bottom 9 of the refrigeration chamber 4. In the area of the rear margin 20 a housing 22 is rigidly connected to the plate 10 by adhesion. Within the housing 22, hidden light emitting diodes (shown in broken line) are soldered as light sources 24 onto a platen (not shown) along the entire length of the margin 20 and spaced substantially evenly from each other. Light emitting diodes are standard components of long life expectancy which are available inexpensively. For their current supply the light emitting diodes 24 they are electrically connected by leads arranged on the platen to electrical contacts, i.e. pins as first electrical or electromagnetic transmission means 26. Openings are provided in the walls of the housing 22 extending parallel to the margins 16 of the plate 10 through which the pins 26 extend out of the housing 22, the pins 26 extending vertically with respect to the walls of the housing 22. In this embodiment, the pins 26 are structured as additional support elements for supporting the plate 10 on the body of the refrigerator 2 with the pins 26 being partially positioned on the protrusions 6 when the plate 10 is in its inserted state.

As an alternative to conventional light emitting diodes, organic light emitting diodes are conceivable as well as light sources 24. For instance, organic light emitting diodes make it possible to structure the electric light source 24 as one which extends along the entire margin 20 of the plate 10. In this manner, it is possible to attain a particularly homogeneous illumination of the plate 10.

The surface of the lower surface 14 of the plate 10 may, for instance, be provided with areas roughened by etching or sand-blasting, i.e. recesses functioning as light output surfaces 28, see FIG. 2. By roughening the surface of the lower surface 14, even complicated geometries of light output surfaces 28, e.g., signatures such as company names or the like, can be produced. The share of the roughened surface relative to the entire surface of the lower surface 14 is larger in the area close to the front margin 18, i.e. further removed from the light emitting diodes 24, than in the area close to the rear margin 20, resulting in a more uniform light distribution over the lower surface 14. It is, however, also possible to provide the recesses or roughened areas at the upper surface 12 of the plate 10. The disadvantage would be that the roughened areas would be more subject to soiling because of food being deposited on the plate 10.

Figure 3:
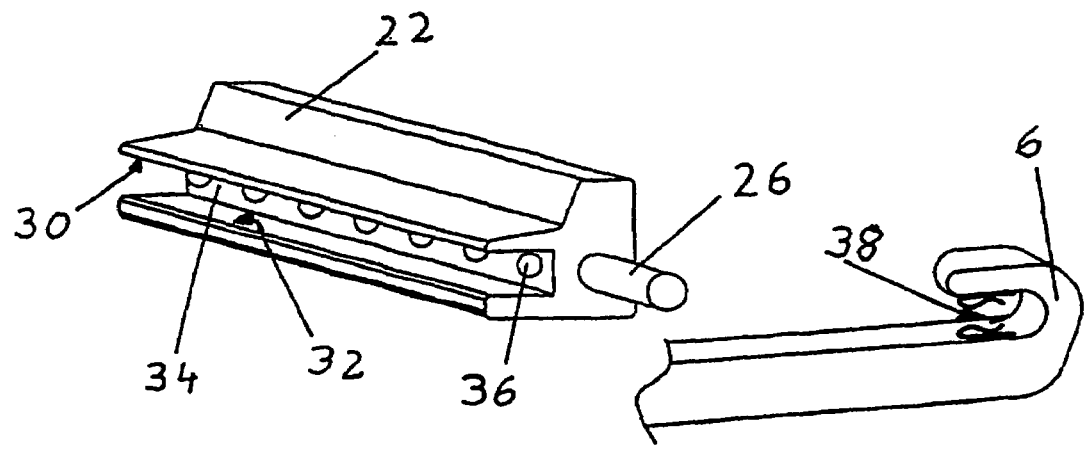
FIG. 3 is a perspective view of the housing connected with the support of FIG. 2 and of a second electrical contact structured as a receptacle.

FIG. 3 depicts the housing 22 of FIG. 2 without the plate 10. At the side facing the plate 10, the housing 22 is provided with an inner section formed by two protrusions. In an assembled state in which the housing 22 is adhesively connected to the plate 10, the inner surfaces of this inner section, i.e. the upper inner surface 30, the lower inner surface 32 and the rear inner surface 34 are respectively positioned opposite the upper surface 12, the lower surface 14 and the rear margin 20. In this embodiment, the adhesive is applied only between the upper inner surface 30 and the upper surface 12 as well as between the lower inner surface and the lower surface 14 to prevent the adhesive from blocking the light path between the light emitting diodes 24 and the rear margin 20 of the plate 10. Openings 36 facing the light emitting diodes 24 are formed in the wall of the housing 22 associated with the rear inner surface 34 so that the light path is not blocked by the housing 22. As an alternative, the wall which in the assembled state faces the rear margin 20 could be structured to be light previously.

Furthermore, FIG. 3 depicts the second electrical or electromagnetic transmission means 38 structured as the second electrical contact, i.e. as a receptacle. The receptacle 38 is arranged in the area of the protrusion 6 opposite the rear wall 8 of the refrigeration chamber 4, in a recess of the protrusion 6. In this embodiment, each protrusion 6 of the refrigerator 2 shown in FIG. 1 is provided with a recess 38 so that the plate 10 may be inserted into the refrigeration chamber 4 in any plane formed by two opposite protrusions 6 in the two lateral walls. At the lateral walls of the recesses the receptacles 38 are formed as resilient metal strips which thus also constitute the resilient safety component. This provides for a simple and functionally secure electrical connection between the first electrical contact 26 and the second electrical contact 38.

Another possible embodiment of the invention, the second electrical contacts 38 are structured as second contact sites positioned substantially coplanarly in a surface of the body and the first electrical contacts 26 are structured as first surface contact sites positioned coplanarly in a surface of the marginal section of the plate 10 for electrical connection with the corresponding second electrical contact sites 38. This results in a structure of the first and second electrical contacts 26, 28 which is optically particularly inconspicuous and which facilitates cleaning of the refrigeration chamber 4.

In the present embodiment the electrical light source, when switched on, is connected to low voltage. This makes it possible to structure the first and second electrical contacts 26, 28 as well as the electric light source 24 without touch guard. Moreover, the low voltage used is alternating voltage to prevent galvanic action in the contact area of the first and second electrical contacts 26, 28.

The operation of the refrigeration appliance 2 in accordance with the invention will hereafter be explained with reference to the above embodiment and to FIGS. 1 to 3.

The door 3 of the refrigerator is open rendering the refrigeration chamber 4 accessible from the exterior. The plate 10 structured as a support is placed by its pins 26 on opposite protrusions 6 at their regions near the door and is then pushed into the refrigerating chamber 4. In its inserted state, the plate 10 is received completely in the refrigerating chamber 4 and is positioned by its pins 26 and the support component 19 on two opposite protrusions 6 formed in the two lateral walls of the refrigerating chamber 4. In the inserted state not shown, the pins 26 are seated in the corresponding recesses 38 and because of the form of the recesses 38, they are secured in this engagement position as resilient safety components against any undesired change of position.

The electrical current circuit by which the light emitting diodes 24 in their switched-on state are fed with electrical energy is provided with a switch (not shown). When the door 3 is closed, i.e. when the refrigerating chamber is inaccessible from the exterior, this switch opens the electrical current circuit and the refrigerating chamber 4 is not illuminated. With the door 3 open, the electrical current circuit is closed by the switch, electrical current is fed from the second electrical or electromagnetic transmission means 38 to the first electrical or electromagnetic transmission means 26 and the light emitting diodes 24 are energized. The light emitted from the light emitting diodes 24 in part exits through the openings 36 formed in the housing 22 and impinges upon the rear margin 20 of the plate 10 positioned opposite the rear inner surface 34. To improve the yield of the light it is possible to provide reflecting means such as concave mirrors, in the vicinity of each light emitting diode 24 so that the emitted light is reflected as beams in the direction of the opening 36. The light pervious plate 10 conducts the light coupled in this manner to the roughened areas. Since total reflection does not exist in these areas the light will emitted in these areas of the plate 10. This leads to a particularly uniform illumination of the refrigerating chamber 4. Since in this embodiment the energized light emitting diodes are connected to low voltage, there is no need to structure the electrical contacts, i.e. pins 26 and receptacles 38, as well as the light sources, i.e. light diodes 24, to be safe when touched. The low voltage used is an alternating voltage.

Figure 4:
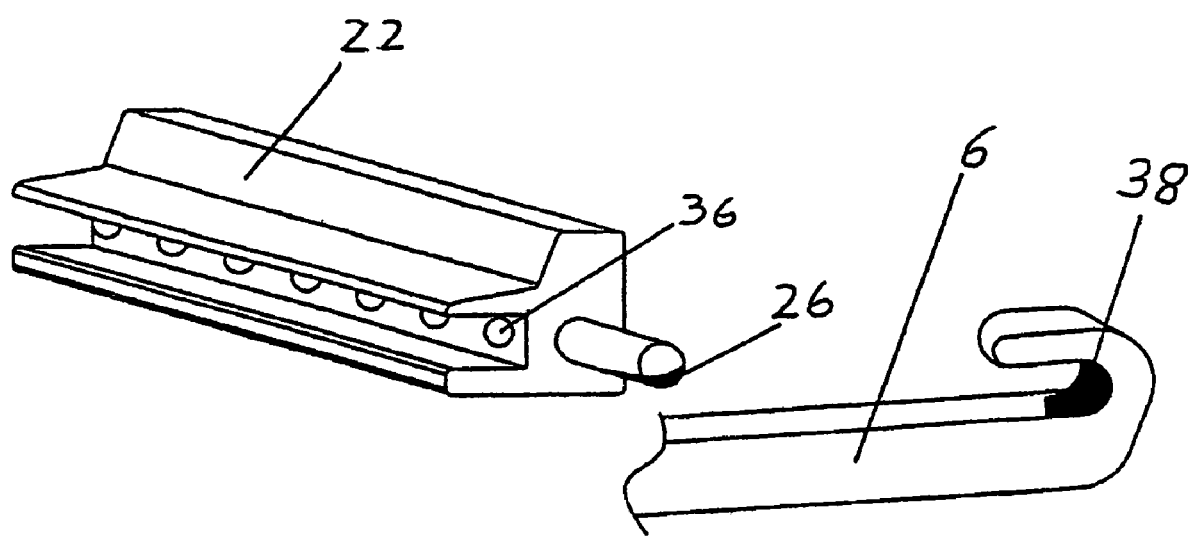
FIG. 4 is a perspective view of a second embodiment of a refrigerating appliance in accordance with the invention analogous to FIG. 3.

FIG. 4 depicts a second embodiment of the refrigerating appliance 2 in accordance with the invention. By contrast to the previous embodiment, the structure of the electrical contacts 26, 38 is different. The second electrical contacts 38 are structured as planar contact positions disposed substantially in the same plane as a surface of the protrusions 6. The first electrical contacts 26 are structured substantially as planar first contact positions 26 disposed in the same plane as the surface of bolts arranged in a marginal area of the plate 10. In the inserted state, which has already been described, the first contact positions 26 are in electrically conductive engagement with the corresponding second contact positions 38 so that in the energized state, which has also been described already, the light emitting diodes 24 are connected to low voltage and the refrigerating chamber 4 is illuminated. In the embodiment, the structure of the first electric contacts 26 and the second electric contacts 38 is optically especially inconspicuous and cleaning of the refrigerating chamber 4 is simplified.

In a further embodiment of the invention the first electrical or electromagnetic transmission means 26 may be structured as an electrical secondary coil, and the second electrical or electromagnetic transmission means may be structured as an electrical primary coil. In this manner, power, i.e. electrical current, may be inductively transmitted from the second electromagnetic transmission means 38 to the first electromagnetic transmission means 26, so that the formation of sparks between first and second electrical contacts is effectively prevented when in the interior of the refrigerating appliance, i.e. the refrigerator 4, is closed by the door 3, since no such contacts are required.

Another possible embodiment provides for a safety means, for instance a reed contact switch, in the refrigerating appliance 2, to prevent the formation of sparks between the first and second electrical contacts in the interior of the refrigerating appliance when its door is closed. Even if electrical contacts 26, 38 are arranged within the interior of the refrigerating appliance, i.e. refrigerating chamber, the formation of sparks is thus effectively prevented. Such a safety means could be utilized, for instance, in the first and second embodiments described above. In the exemplarily described reed contact switch a current circuit would only be closed when a permanent magnet arranged on the support 10 would close the reed contact switch when the support 10 is completely inserted.

Moreover, in a further embodiment the refrigerating appliance 2 is provided with a control element and a control unit. The control element serves to feed in or select names of groceries for comparison in an evaluation circuit of the control unit with names of groceries stored in a memory of the control unit for energizing the light source 24 of the plate 10 by the control unit in dependence of the comparison. In this manner it is possible to recommend to the user a position for placing the grocery depending upon its kind and/or weight. Conceivably, once the user is inputted the name of a grocery to be stored, a suitable placement position is indicated to the user by the light sources 24 of the corresponding plate 10 being alternating switched on and off for a limited period of time, so that the blinking plate 10 alerts the user of the placement position suggested by the refrigerating appliance 2. In this fashion, an indication of the placement position recommended to the user is ensured even when the light sources 24 of other plates 10 are energized for illuminating the refrigerating chamber 4.

Figure 5:
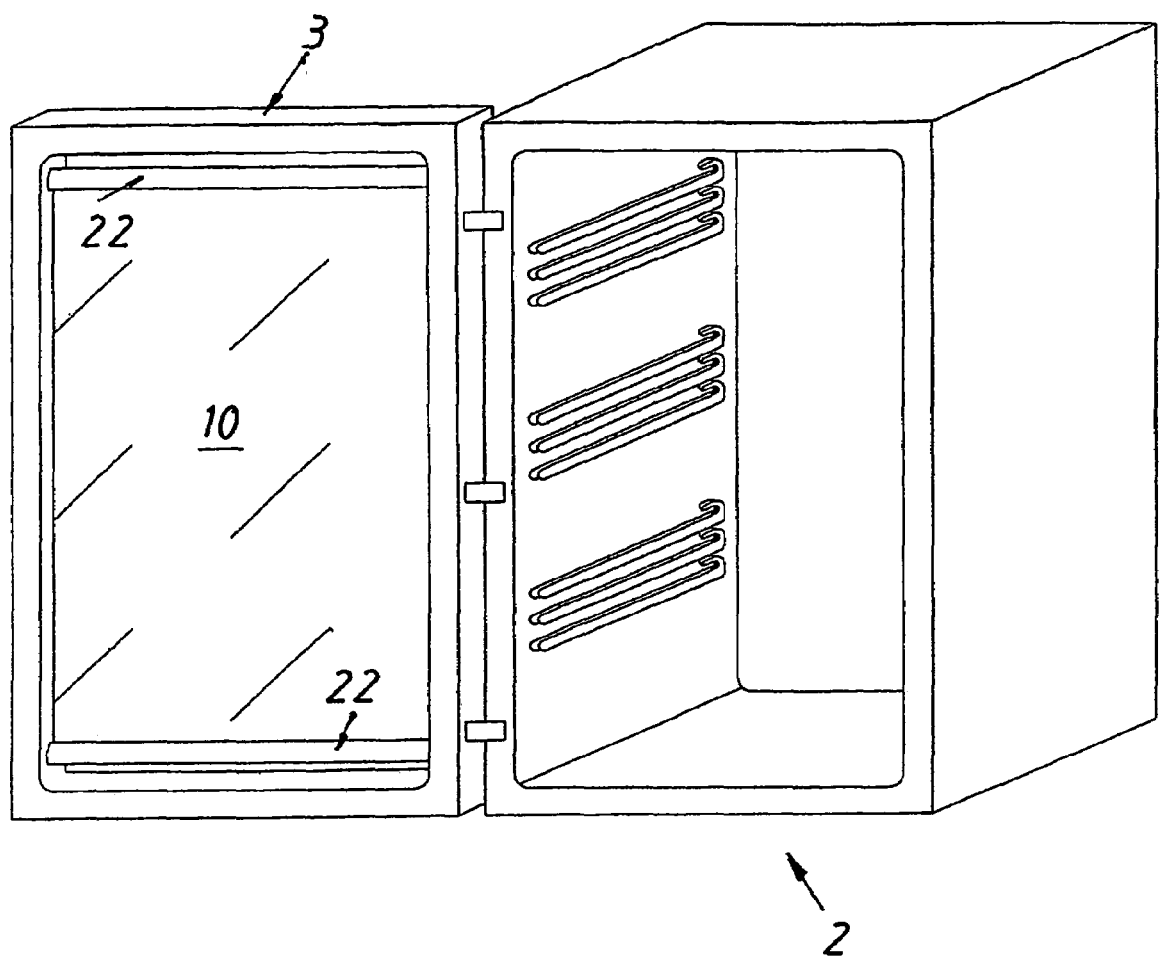
FIG. 5 is a perspective view of a third embodiment of a refrigerating appliance in accordance with the invention, without supports.

FIG. 5 depicts a third embodiment of the refrigerating appliance. By contrast to the previously mentioned two embodiments, there is provided, in addition to the plates 10 structured as supports (not shown here), a plate 10 structured as an intermediate wall removable from the interior surface of the door 3. This ensures a homogeneous appearance for the refrigerating appliance 2 when its door 3 is open since with inserted supports 10 the refrigerating chamber 4 as well as the adjacent inner surface of the door 3 are fully illuminated. Because of the greater length of the intermediate wall 10, the intermediate wall 10, other than the shorter supports 10, is at both margins 20 provided with a housing 22 so that the intermediate wall appears uniformly light. Advantageously, in its other dimensions the intermediate wall 10 resembles the dimensions of the supports 10. This simplifies their manufacture. But for the mentioned differences, the description of the first two embodiments are also applicable to the third embodiment as well as for its plate 10 structured as an intermediate wall. Further supports may be mounted at the inner surface of the door 3 in front of the intermediate wall, in a manner known to a person skilled in the art. As an alternative to this embodiment the intermediate wall 10 may be subdivided into individually illuminated sections. By associating different light sources 24 with the individual sections of the intermediate wall 10 it is possible, similar to the first two embodiments, to provide for placement recommendations relating to the further supports arranged at the inner surface of the door.

What is claimed is:

1. A refrigerating appliance, comprising:
   at least first and second walls positioned in substantially parallel vertical planes;
   a plurality of first protrusions arranged in the first wall in substantially parallel horizontal planes;
   a plurality of second protrusions arranged in the second wall in the parallel horizontal planes;
   at least one plate made of photoconductive material and adapted to be inserted between the first and second walls for selective placement in any one of the parallel horizontal planes;
   at least one electrically energizable light source mounted on a margin of the plate;
   first means mounted on the plate for energizing the light source; and
   second means mounted on the protrusions for selective electrically conductive connection with first means.

2. The appliance of claim 1, wherein the first means is an electrical secondary coil and the second means is an electrical primary coil.

3. The appliance of claim 1, wherein the first means is an electrical contact of a first predetermined configuration and the second means is an electrical contact of a second configuration complementing the first configuration.

4. The appliance of claim 3, wherein one of the first and second configurations is a pin and the other of the first and second configurations is a recess for receiving the pin.

5. The appliance of claim 1, wherein the first and second means are contact surfaces disposed coplanarly in surfaces of the plate and surfaces of the protrusions.

6. The appliance of claim 1, wherein the light source is mounted in a housing rigidly connected to the plate.

7. The appliance of claim 1, wherein the light source is mounted in a housing removably connected to the plate.

8. The appliance of claim 1, wherein the plate is provided with a light output surface formed by a recess in a lateral margin of the plate.

9. The appliance of claim 1, further comprising:
   a control element for inputting or selecting a name of an item to be placed on the plate;
      a control unit comprising a memory for storing a plurality of names of items and an evaluation circuit for comparing an inputted or selected name with a stored name; and
      means for energizing the light source in dependence of the comparison.

10. The appliance of claim 1, further comprising:
    means for preventing the formation of sparks as a result of electrically connecting the first and second means.

* * * * *